(12) United States Patent
Fuertsch et al.

(10) Patent No.: US 6,523,403 B1
(45) Date of Patent: Feb. 25, 2003

(54) MASS FLOW SENSOR

(75) Inventors: Matthias Fuertsch, Gomaringen (DE); Heribert Weber, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/696,461

(22) Filed: Oct. 25, 2000

(30) Foreign Application Priority Data

Oct. 27, 1999 (DE) .......................................... 199 51 595

(51) Int. Cl.[7] .................................................. G01F 1/68
(52) U.S. Cl. .................................................. 73/204.26
(58) Field of Search ........................ 73/204.26, 204.25, 73/205.11

(56) References Cited

U.S. PATENT DOCUMENTS

| | | | | |
|---|---|---|---|---|
| 5,393,351 A | * | 2/1995 | Kinard et al. ............ | 73/204.26 |
| 5,464,966 A | * | 11/1995 | Gaitan et al. ............ | 73/204.26 |
| 5,818,071 A | * | 10/1998 | Loboda et al. ............ | 257/55 |
| 6,110,788 A | * | 8/2000 | Violette et al. ............ | 438/301 |

* cited by examiner

*Primary Examiner*—Harshad Patel
(74) *Attorney, Agent, or Firm*—Kenyon & Kenyon

(57) ABSTRACT

A mass flow sensor is described. To improve the membrane stability of the known mass flow sensor and to increase the thermal conductivity of a membrane having a greater mechanical stability, in particular the membrane has at least one dielectric or nonconducting adjustment layer with a thermal conductivity which is greater than that of a silicon oxide layer of the same thickness, the adjustment layer being used to adjust the thermal conductivity of the membrane. One of the preferred adjustment layers is polycrystalline silicon.

12 Claims, 3 Drawing Sheets

MASS FLOW SENSOR

BACKGROUND INFORMATION

The present invention relates to a mass flow sensor.

SUMMARY OF THE INVENTION

The mass flow sensor according to the present invention has the advantage of an improved membrane stability because of at least one adjustment layer in a membrane according to the present invention.

Due to the use of one or more preferably dielectric or nonconducting adjustment layers in a membrane according to the present invention, it is possible to design the membrane to have much greater mechanical stability, either because of a thicker membrane on the whole in comparison with the known membrane and/or because a layer sequence in the membrane according to the present invention which has a greater mechanical stability but the same layer thickness as the known membrane. Despite the greater mechanical stability with the same or greater total layer thickness of a membrane according to the present invention in comparison with the known membrane, a membrane according to the present invention has a thermal conductivity corresponding to or even exceeding that of the known membrane because of the adjustment layer(s) according to the present invention. Due to the measures according to the present invention, it is possible to produce a mass flow sensor having greater mechanical stability than the known mass flow sensor and nevertheless having a response time corresponding at least to that of the known mass flow sensor.

It is especially advantageous if at least one adjustment layer contains polycrystalline silicon.

Polycrystalline silicon, i.e. polysilicon, has a much higher thermal conductivity than silicon oxide or silicon nitride. A layer of polycrystalline silicon thus permits a more rapid dissipation of heat than a layer of silicon or silicon nitride in the same thickness. Due to the use of polycrystalline silicon or an adjustment layer of polycrystalline silicon, it is possible to increase the layer of thickness of a membrane according to the present invention in comparison with the known membrane. If a silicon oxide layer and/or a silicon nitride layer of the known membrane is replaced entirely or partially by a layer of polycrystalline silicon, a thicker membrane can be produced in comparison with the known membrane and it will have a thermal conductivity equal to or even greater than the thermal conductivity of the known membrane. Conversely, this then yields a membrane according to the present invention whose heat storage capacity is equal to or even lower than the heat storage capacity of a known membrane, so despite the greater total thickness of a membrane according to the present invention in comparison with a known membrane, it is possible to implement a mass flow sensor having at least the electric properties of the known membrane such as a rapid response time in particular.

In addition, it is advantageous if the membrane according to the present invention is formed by not only silicon oxide and silicon nitride but also other layers, all of which together are called adjustment layers. In addition to possible adjustment layers of silicon oxide and silicon nitride, these layers or adjustment layers preferably include layers of the above-mentioned polysilicon, silicon oxynitride, silicon carbide, metals or metal oxides. These metals may be, for example, platinum, titanium, palladium, nickel, aluminum, gold, chromium, tungsten or tantalum. The metal oxides may be, for example, titanium oxide, aluminum oxide, tungsten oxide or tantalum oxide. It is self-evident that these are only a few examples of implementation of the present invention.

It is advantageous that these materials for forming a membrane according to the present invention increase its mechanical stability in comparison with that of the known membrane. Furthermore, the materials according to the present invention make it possible to adjust the average thermal conductivity of a membrane according to the present invention because of the difference in their thermal conductivities and through a suitable sequence of layers or a combination of the above-mentioned adjustment layers. Preferably a membrane having greater mechanical stability than the known membrane and having an average thermal conductivity which corresponds at least to that of the known membrane is formed according to the present invention with the membrane materials mentioned above.

DETAILED DESCRIPTION

Figure 1:
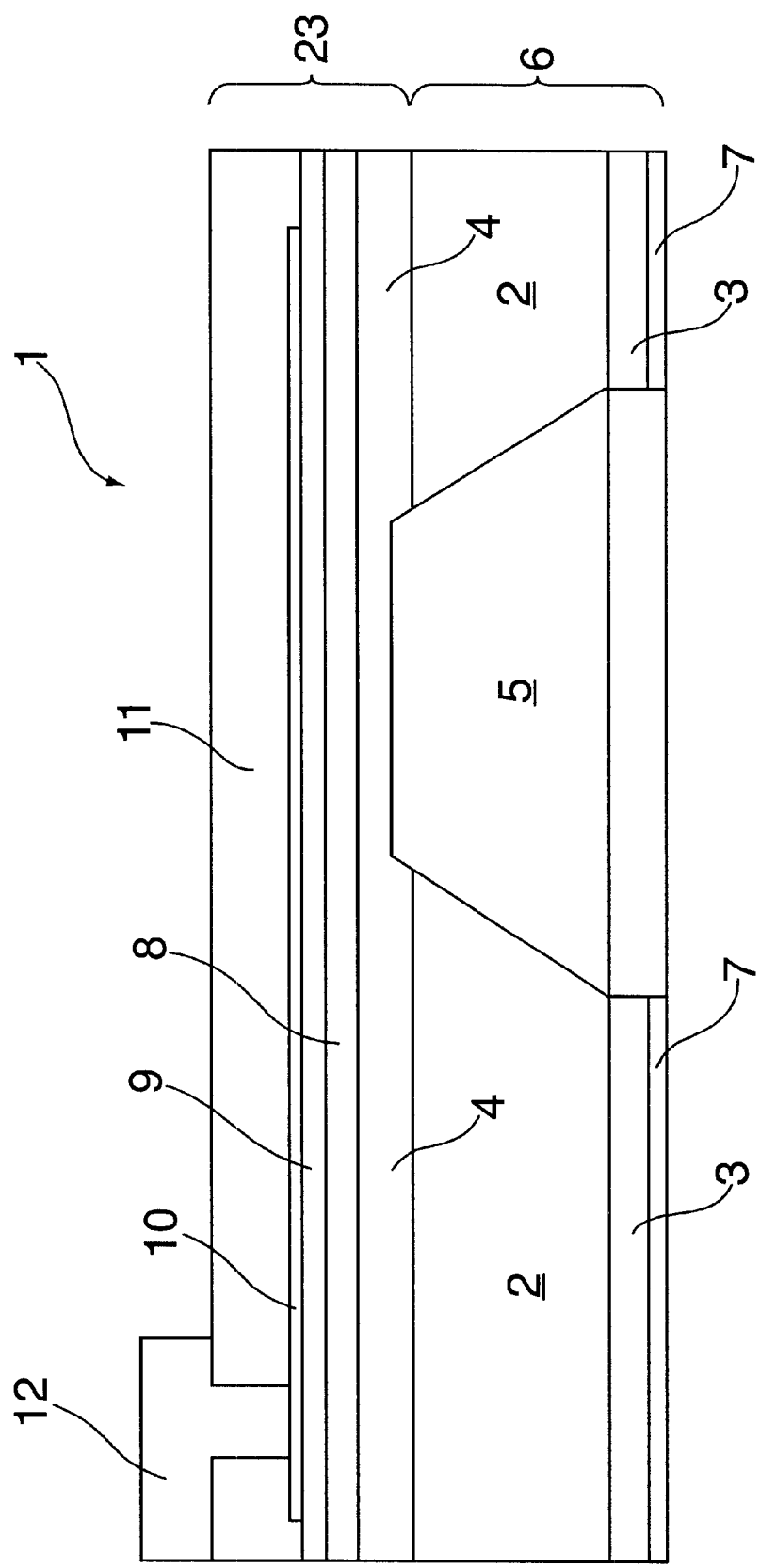
FIG. 1 shows a known semiconductor mass flow sensor having a membrane, in cross section.

Mass flow sensor 1 illustrated in FIG. 1 has a frame 6, a membrane 23 arranged on frame 6, preferably used to measure an air flow, and a metal layer, preferably a platinum layer 10, arranged in membrane 23.

To produce the known mass flow sensor 1 as illustrated in FIG. 1, a silicon substrate 2 having a (100) orientation is oxidized in a known way, e.g., in a horizontal oven, by supplying oxygen to its surfaces, forming a silicon oxide layer 3 beneath silicon substrate 2 and forming a silicon oxide layer 4 above silicon substrate 2.

A silicon nitride layer 7 and a silicon nitride layer 8 are deposited on the top and bottom sides of the layer system composed of silicon substrate 2, lower silicon oxide layer 3 and upper silicon oxide layer 4. Silicon nitride layers 7 and 8 are produced by chemical vapor deposition (CVD), more precisely by low-pressure chemical vapor deposition (LPCVD) in the case of known membrane 23.

After the top and bottom sides have been provided with a silicon nitride layer, the surface of silicon nitride layer 8 above frame 6 is converted to a silicon oxide layer. This silicon oxide layer, which is referred to below as reoxide layer 9, forms the substrate for platinum layer 10, which covers most of reoxide layer 9.

Electrically insulated structures (not shown) are produced in platinum layer 10 in a known way by etching. The structures, each of which is provided with two terminals (not shown) to establish an electric connection form at least one heating element (not shown) to create a mass flow sensor and two temperature measurement elements (not shown), preferably one of which is arranged at the left of the heating element and one at the right of the heating element.

Platinum layer 10 is subsequently provided with a silicon oxide layer 11 as part of another CVD process step. In the CVD process step to form silicon oxide layer 11, a plasmaenhanced chemical vapor deposition method (PECVD) is preferably used. The PECVD method is known and therefore need not be explained further here. One advantage of using a PECVD method is that low growth rates can also be achieved reproducibly.

After coating platinum layer 10 with silicon oxide layer 11, silicon oxide layer 11 is etched so that structures provided in platinum layer 10 can be contacted electrically to form the heating element or temperature measurement element(s). After producing appropriate etched holes in silicon oxide layer 11, aluminum contact terminals are produced in a known way, of which only a single aluminum contact terminal 12 contacting the structures in platinum layer 10 and functioning as an external electric terminal of mass flow sensor 1 is illustrated in FIG. 11 as an example.

The layer system composed of silicon substrate 2 and silicon oxide layers 3 and 4 is then etched, preferably with potassium hydroxide (KOH), to produce a recess 5 in silicon substrate 2 in the form of a truncated pyramid having a trapezoidal cross section tapering toward the membrane because of the difference in etching rates of KOH in the crystal direction of silicon and the crystal direction, thus forming frame 6 and membrane 23.

Figure 2:
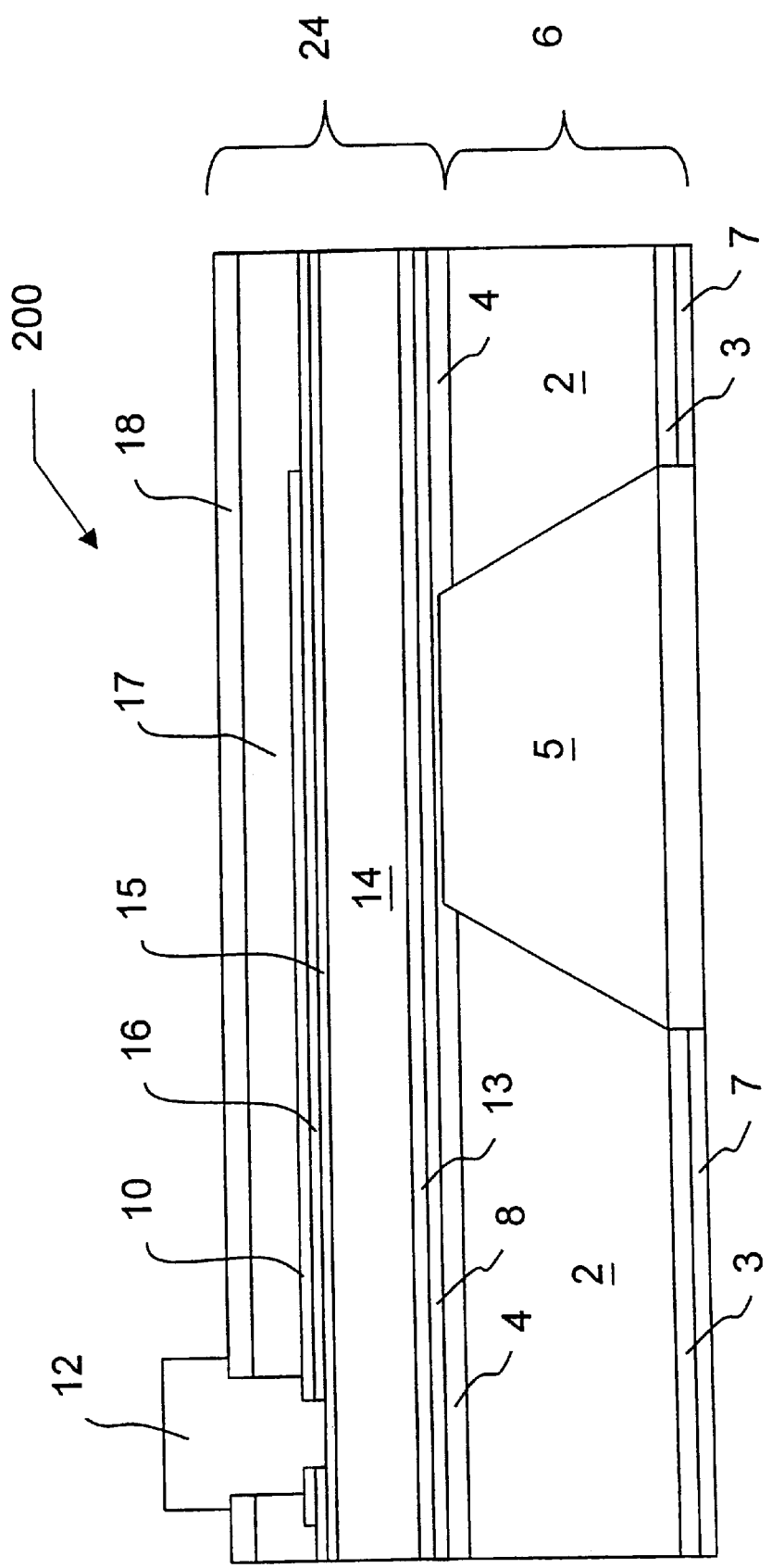
FIG. 2 shows a semiconductor mass flow sensor according to the present invention having a membrane designed with greater mechanical stability in comparison with the known membrane and having adjustment layers and a moisture barrier, shown in cross section.
Figure 3:
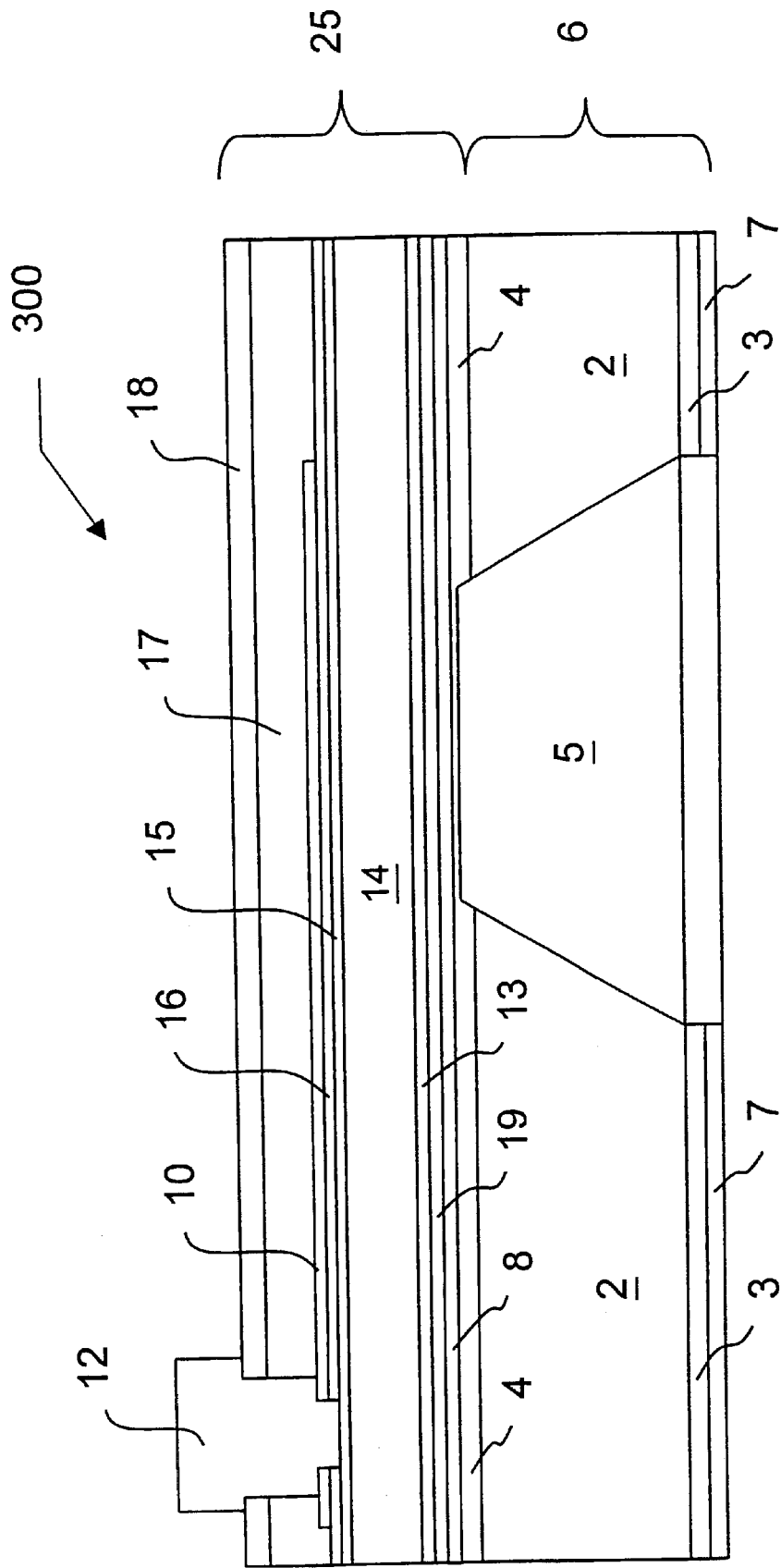
FIG. 3 shows a semiconductor mass flow sensor according to the present invention having a different adjustment layer in contrast with the mass flow sensor illustrated in FIG. 2, shown in cross section.

Mass flow sensor 1 in FIG. 1 and the mass flow sensors according to the present invention as illustrated in the additional figures are typically used in the intake duct of internal combustion engines to measure the amount of air supplied to the internal combustion engine and its direction of flow. Since air supplied to the internal combustion engine often contains particles, these particles may strike mass flow sensor 1 or membrane 23, resulting in the destruction of membrane 23. To counteract this problem, mass flow sensors 200 and 300 according to the present invention, as illustrated in FIGS. 2 and 3, are each provided with a membrane 24 and 25 which has a greater mechanical stability than membrane 23 of the known mass flow sensor 1 of FIG. 1.

A sufficient stability with respect to the bombardment with particles described here can be achieved in particular by forming a membrane according to the present invention whose total layer thickness is greater than the total layer thickness of known membrane 23, thus achieving a sufficient mechanical stability of the membrane according to the present invention and preventing rupture of the membrane.

However, it is self-evident that the total layer thickness of a membrane according to the present invention can be selected as a function of the given layer system of the membrane or the entire sensor. The total layer thickness of a membrane according to the present invention could thus be equal to or less than that of the known membrane, if the given layer system has an adequate mechanical stability with respect to bombardment by particles as described above due to its arrangement and/or its composition of the layers forming the membrane.

The specific design of the layer sequence of a membrane according to the present invention or its thickness will of course usually depend naturally on the specific physical conditions prevailing in the intake channel into which the mass flow sensor is to be introduced.

However, it is especially important that the heat storage capacity of a membrane increases with a simple enlargement of its total layer thickness due to layers having a low thermal conductivity. This circumstance has a negative effect on the response time of a membrane which is merely "inflated" in comparison with the known membrane, i.e., such a membrane results in a sensor with a longer response time.

An important aspect of the present invention to overcome this disadvantage is to partially or completely replace one or more of the silicon oxide layers and/or the silicon nitride layer of the known membrane by one or more layers referred to as adjustment layers.

It is preferable to provide one or more adjustment layers having one or more layers made of or containing silicon oxide, silicon nitride, silicon oxynitride, polysilicon, silicon carbide, one or more metals and/or one or more metal oxides. The metals may include, for example, platinum, titanium, aluminum, chromium, gold, palladium, nickel, tungsten or tantalum, and the metal oxides may be titanium oxide, tantalum oxide, tungsten oxide or aluminum oxide.

Through a suitable choice of such layers and/or a suitable choice of a layer sequence, it is possible to produce a membrane that is thicker in comparison with known membrane 23 and/or is more stable with respect to bombardment with particles but has largely the same or a greater thermal conductivity than known membrane 23. According to the present invention, the known membrane is preferably "thickened" mainly or entirely beneath the platinum layer. In this way, the sandwich structure can be conditioned, e.g. by tempering, independently of the conditioning of platinum. The temperature coefficient of the resistance of platinum is thus unaffected by the tempering conditions of the sandwich structure.

FIG. 2 shows a mass flow sensor 200 according to the present invention, whose frame 6, silicon oxide layer 4, LPCVD silicon nitride layer 8, platinum layer 10 and aluminum contact terminal 12 correspond to those of the known mass flow sensor shown in FIG. 1.

In the case of the mass flow sensor according to the present invention, illustrated in FIG. 2, which has a membrane 24 different from that shown in FIG. 1, a first PECVD silicon nitride layer 13 is deposited on silicon nitride layer 8. In the direction toward the top side of mass flow sensor 1, the layers follow in the order: first PECVD silicon oxide layer 14, second PECVD silicon nitride layer 15, second PECVD silicon oxide layer 16, platinum layer 10, third PECVD silicon oxide layer 17 and finally, third PECVD silicon nitride layer 18, forming a cover layer and a moisture barrier of mass flow sensor 200 in FIG. 2.

The mechanical stability of the known membrane illustrated in FIG. 1 can be increased while at the same time possibly adjustment the thermal conductivity by using the layer sequence given above for membrane 24 according to the present invention as illustrated in FIG. 2, which is only one example of a plurality of possible embodiments of the present invention. Silicon nitride layer 18, which is provided as the top layer or the cover layer, also permits a very good moisture stability of membrane 24, which is illustrated in FIG. 2, and effectively prevents moisture, such as atmospheric humidity in particular in the intake channel where a mass flow sensor may be arranged according to FIG. 2, from penetrating into the membrane, which would have negative effects on the mechanical stability of the membrane as well as its electric properties.

FIG. 3 shows a mass flow sensor 300 according to the present invention which, in contrast with the mass flow sensor illustrated in FIG. 2, has a polysilicon layer 19. Polysilicon layer 19, another adjustment layer in addition to silicon oxide and silicon nitride adjustment layers, is provided between the LPCVD silicon nitride layer 8 and the first PECVD silicon nitride layer 13 in membrane 25 as illustrated in FIG. 3.

Polysilicon or polysilicon layer 19 has a much greater thermal conductivity for the same layer thickness than silicon oxide or silicon nitride, and this makes it possible to create a membrane that is thicker but has a relatively minor increase in heat storage capacity.

Preferably an LPCVD silicon nitride layer which resists attack by KOH is used as the etch stop layer in KOH etching. The LPCVD silicon nitride layer may either be deposited directly on the silicon substrate or it may be deposited on a silicon oxide layer produced previously to permit better isolation of stresses. As an alternative, instead of using an LPCVD silicon nitride layer, it would also be possible to use a different KOH-resistant layer, such as silicon oxynitride, silicon carbide or certain metals known for this purpose.

Instead of a moisture-resistant PECVD silicon nitride layer 18 as the cover layer on the mass flow sensor 200 and 300, a silicon carbide layer may also be used as the cover layer. It is also conceivable to produce such a cover layer by means of chemically resistant metals such as platinum, gold, etc., or by metal oxides.

In the case of another advantageous embodiment of the present invention (not shown), silicon nitride layer 8 of membranes 24 and 25 in FIGS. 1 and 2 may be produced by PECVD instead of LPCVD.

LIST OF REFERENCE NUMBERS

1 mass flow sensor
2 silicon substrate
3 silicon oxide layer
4 silicon oxide layer
5 recess
6 frame
7 silicon nitride layer
8 LPCVD silicon nitride layer
9 reoxide layer
10 platinum layer
11 silicon oxide layer
12 aluminum contact terminal
13 first PECVD silicon nitride layer
14 first PECVD silicon oxide layer
15 second PECVD silicon nitride layer
16 second PECVD silicon oxide layer
17 third PECVD silicon oxide layer
18 third PECVD silicon nitride layer
19 polysilicon layer
23 membrane
24 membrane
25 membrane
200 mass flow sensor
300 mass flow sensor

What is claimed is:

1. A mass flow sensor, comprising:
   a frame formed at least in part by silicon;
   a membrane held by the frame, the membrane including at least one dielectric adjustment layer having a thermal conductivity that is greater than a thermal conductivity of a silicon oxide layer of the same thickness, the at least one dielectric adjustment layer adjusting a thermal conductivity of the membrane, the at least one dielectric adjustment layer including at least two separate layers of silicon nitride;
   a metal layer arranged above the frame;
   a heating element formed by a first structure in the metal layer; and
   at least one temperature measurement element formed by a second structure in the metal layer.

2. The mass flow sensor according to claim 1, wherein: the at least one dielectric adjustment layer is non-conducting.

3. The mass flow sensor according to claim 1, wherein the membrane includes at least two separate layers of silicon oxide.

4. The mass flow sensor according to claim 1, wherein: the at least one dielectric adjustment layer is formed by a PECVD operation.

5. A mass flow sensor, comprising:
   a frame formed at least in part by silicon;
   a membrane held by the frame, the membrane including at least one dielectric adjustment layer having a thermal conductivity that is greater than a thermal conductivity of a silicon oxide layer of the same thickness, the at least one dielectric adjustment layer adjusting a thermal conductivity of the membrane;
   a metal layer arranged above the frame;
   a heating element formed by a first structure in the metal layer; and
   at least one temperature measurement element formed by a second structure in the metal layer;
   wherein at least one of the at least one dielectric adjustment layer includes one of polycrystalline silicon, silicon oxynitride, silicon carbide, at least one metal, and at least one metal oxide.

6. The mass flow sensor according to claim 5, wherein: the at least one metal includes one of platinum, titanium, palladium, nickel, tungsten, aluminum, gold, chromium, and tantalum.

7. The mass flow sensor according to claim 5, wherein: the at least one metal oxide includes one of titanium oxide, aluminum oxide, tungsten oxide, and tantalum oxide.

8. The mass flow sensor according to claim 1, wherein: the at least one dielectric adjustment layer forms a cover layer of the membrane.

9. A mass flow sensor, comprising:
   a frame formed at least in part by silicon;
   a membrane held by the frame, the membrane including at least one dielectric adjustment layer having a thermal conductivity that is greater than a thermal conductivity of a silicon oxide layer of the same thickness, the at least one dielectric adjustment layer adjusting a thermal conductivity of the membrane, the at least one dielectric adjustment layer including at least two separate layers of silicon nitride;
   a metal layer arranged above the frame;
   a heating element formed by a first structure in the metal layer; and
   at least one temperature measurement element formed by a second structure in the metal layer;
   wherein a top-most layer of the membrane is a layer of silicon nitride.

10. The mass flow sensor according to claim 8, wherein: the cover layer includes silicon carbide.

11. The mass flow sensor according to claim 8, wherein: the cover layer is formed by one of a PECVD operation and a LPCVD operation.

12. A mass flow sensor, comprising:
   a frame formed at least in part by silicon;
   a membrane held by the frame, the membrane including at least one dielectric adjustment layer having a thermal conductivity that is greater than a thermal conductivity of a silicon oxide layer of the same thickness, the at least one dielectric adjustment layer adjusting a thermal conductivity of the membrane, the at least one dielectric adjustment layer including at least two separate layers of silicon nitride;
   a metal layer arranged above the frame;
   a heating element formed by a first structure in the metal layer; and
   at least one temperature measurement element formed by a second structure in the metal layer.

* * * * *